April 14, 1925.  
W. E. WALLER  
POULTRY RACK  
Filed Dec. 26, 1924

1,533,484

W. E. Waller  
Inventor

Patented Apr. 14, 1925.

1,533,484

UNITED STATES PATENT OFFICE.

WARREN E. WALLER, OF CHARLES CITY, IOWA.

POULTRY RACK.

Application filed December 26, 1924. Serial No. 758,203.

*To all whom it may concern:*

Be it known that I, WARREN E. WALLER, a citizen of the United States, residing at Charles City, in the county of Floyd and State of Iowa, have invented a new and useful Poultry Rack, of which the following is a specification.

This invention relates to poultry house equipment and more particularly to roosts therefor.

The object of the invention is to provide a simple and efficient perch rack for supporting the perches or roosts for the fowls.

Another object is to so construct a rack of this character as to prevent the poultry from falling from the perches down below onto the floor and yet permit the droppings to pass below the rack and thus protect the feet of the fowls from becoming soiled.

Another object is to so construct a rack of this character that it may be raised when necessary for cleaning off the dropping board which is designed to be arranged beneath the rack.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
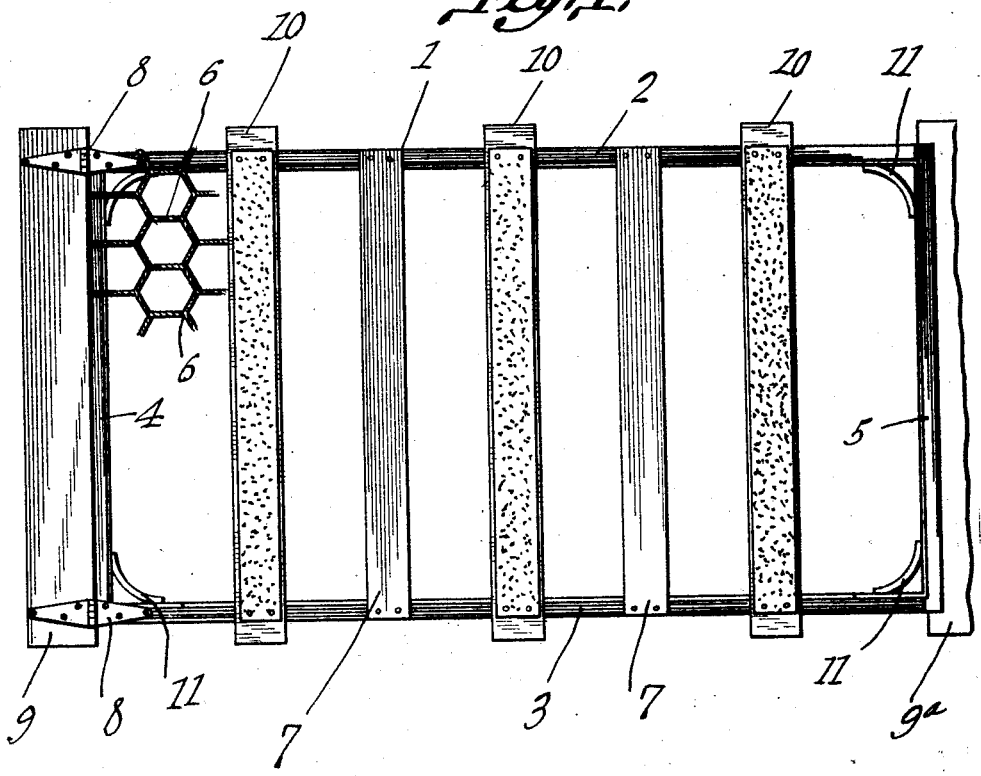
Figure 2:
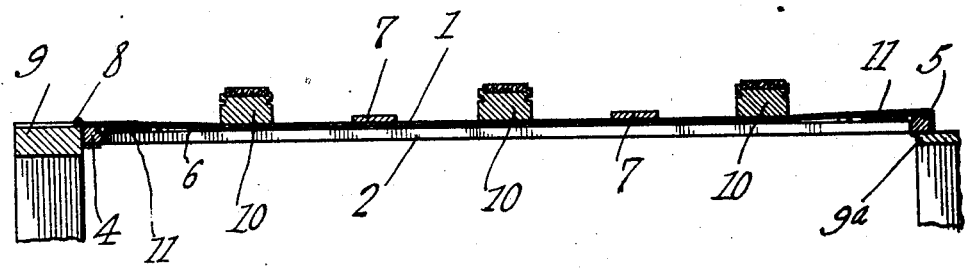

Figure 1 represents a plan view of a rack constructed in accordance with this invention shown in lowered position ready for use; and Fig. 2 is a longitudinal section thereof.

In the embodiment illustrated the rack 1 constituting this invention comprises a rectangular frame composed of side bars 2 and 3 connected at their ends by cross bars 4 and 5. This rack or frame 1 is covered with a wire netting 6 the mesh of which is of sufficient size to permit the poultry droppings to pass therethrough and which will thus protect the poultry should they drop off the perches from falling down under the rack.

This rack 1 has perches 10 mounted transversely thereon at longitudinally spaced intervals, said perches being of any suitable or desired construction and any number of which may be employed according to the size of the rack, three being here shown.

Arranged between the perches 10 and secured to the side bars 2 and 3 are strips 7 which are designed as foot boards for the poultry when passing from one perch to the other.

The rack 1 is hinged at one end as shown at 8 to a supporting bar 9 and at its other end rests on a similar bar 9ª so that the rack may be swung upward out of the way when desirable for cleaning out the dropping board or otherwise.

This rack 1 is preferably braced at its corners by corner braces 11 to render it strong and rigid to resist the strains to which it will be subjected.

I claim:—

1. A poultry perch supporting rack made in the form of a skeleton frame having an open mesh wire arranged thereover and equipped with hinges for connecting it to a support at one end, the other end being designed to rest on a suitable support, and perches mounted on said rack.

2. A poultry perch supporting rack made in the form of a skeleton frame having an open mesh wire arranged thereover and equipped with hinges for connecting it to a support at one end, the other end being designed to rest on a suitable support, and perches mounted on said rack, said perches being spaced longitudinally apart and having a floor board located between them.

In testimony that I claim the foregoing as my own, I have hereto affixed my signature in the presence of two witnesses.

WARREN E. WALLER.

Witnesses:
 EDGAR BALL,
 W. LOREN PAIR.